Patented Apr. 17, 1945

2,373,800

UNITED STATES PATENT OFFICE 2,373,800

PREPARATION OF ALKALI METAL AZIDES

Marshall F. Acken and William F. Filbert, Woodbury, N. J., assignors to E. I. du Pont de Nemours & Company, Wilmington, Del., a corporation of Delaware No Drawing. Application April 12, 1941,
Serial No. 388,278

8 Claims. (Cl. 23—101)

This invention relates to a novel method for the preparation of alkali metal azides and more particularly to such a method whereby greater efficiency and safety in operation results.

Various methods have been employed in the past for the production of alkali metal azides, of which one of the preferred has involved the reaction of an alkali metal with anhydrous ammonia to produce an alkali metal amide and the subsequent reaction of the amide with nitrous oxide ($N_2O$). The following reactions illustrate the process:

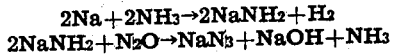

In the above process for the manufacture of sodium azide, for example, molten sodium is ordinarily reacted with anhydrous ammonia gas at elevated temperatures of around 400° C. The sodamide formed in the above reaction is then contacted with nitrous oxide gas at an elevated temperature, for example, around 200° C. with formation of sodium azide. One drawback to the foregoing method has been the necessity of maintaining corrosive and toxic materials such as sodamide and sodium azide at such high temperatures. A process which would allow operating at moderately low temperatures would possess outstanding advantages from the view point of convenience and safety.

An object of the present invention is an improved process for the production of alkali metal azides. A further advantage is a method for the preparation of alkali metal azides which precludes the necessity of elevated operating temperatures. Additional objects will be disclosed as the invention is described more at length hereinafter.

We have found that the foregoing objects are accomplished, and the disadvantages of the prior art overcome, when a procedure is followed in which an alkali metal in metallic form is caused to react with anhydrous liquid ammonia and gaseous nitrous oxide is brought into intimate and reactive contact with the anhydrous liquid mixture containing the alkali amide, which is the reaction product of the alkali metal and ammonia.

While our invention is applicable generally to the alkali metal azides, namely, those of sodium, potassium, and lithium, its principal use will be in the preparation of sodium azide, since this is the most important of the alkali azides industrially. The reaction between gaseous nitrous oxide and the reaction product of sodium and liquid anhydrous ammonia may be effected by merely bubbling the nitrous oxide through the solution where atmospheric pressures will prevail. We find it highly advantageous, however, to maintain the nitrous oxide under a pressure greater than atmospheric. The use of pressure in the system is beneficial for several reasons: (1) It increases the rate of reaction by making possible the use of higher temperatures in the liquid ammonia solution; (2) it increases the concentration of nitrous oxide in contact with the sodamide or other alkali amide because of the greater solubility of nitrous oxide in liquid ammonia under pressure; and (3) it practically eliminates loss of nitrous oxide because of the closed system. It will be desirable likewise to maintain the reaction between metallic sodium and anhydrous liquid ammonia in a closed system also, and under pressure, since this allows the use of a higher temperature for operations than would otherwise be possible, and prevents loss of ammonia.

The degree of pressure desirable when nitrous oxide is reacted with an alkali amide in accordance with our invention, is dependent somewhat on the temperature of the system. The boiling point of liquid ammonia is around $-33°$ C., at which temperature the vapor pressure of ammonia is equal to about 14.7 lbs. per square inch. If the nitrous oxide is introduced into a system at $-33°$ C., therefore, a pressure of nitrous oxide greater than one atmosphere would be required. At temperatures of $0°$ and $+35°$ C. the respective vapor pressures of ammonia are approximately 62 and 196 lbs. per square inch respectively. Whatever the temperature at which the sodium azide reaction is carried out, therefore, the nitrous oxide must be introduced at a pressure greater than the vapor pressure of anhydrous ammonia at the temperature of operation.

In stating that anhydrous liquid ammonia is employed, it will be well to state also perhaps that this material has a critical temperature of 132.4° C. Accordingly it will be appreciated that any system such as the present reaction in which the ammonia remains present as a liquid and in its anhydrous state, no temperature higher than said critical temperature can possibly be obtained consistent with this particular physical state. This fact, of course, is well known to any physical chemist. We point it out here to enable those in the art to fully appreciate the meaning of our statement concerning the use of anhydrous liquid ammonia in this process.

In order to describe our invention more in detail, the following examples are given, which are specific embodiments of its workings and serve to show its advantages.

Example 1

Using a three-necked, two-liter flask provided with stirring mechanism, a curved inlet tube reaching to the bottom of the flask and a vent tube, one liter of anhydrous liquid ammonia was placed in this flask and 0.3 gram of ferric nitrate as catalyst, to which was gradually added 26 grams of metallic sodium. Conversion to sodamide took place immediately. During continued stirring nitrous oxide was bubbled through the solution in the amount of 567 grams over a period of 11 hours. At the completion of the reaction, sufficient methanol was added to destroy any unchanged sodamide. The ammonia was evaporated, the solid taken up with water and the sodium azide separated. The conversion to sodium azide, based on the sodium, was 93.2% of theoretical.

Example 2

The apparatus used for this preparation comprised a two-gallon, agitated autoclave, having a surrounding insulating jacket adapted for cooling or heating said autoclave, as desired. One gallon of anhydrous liquid ammonia was introduced into the autoclave, and then 3 grams of ferric nitrate $(Fe(NO_3)_3-9H_2O)$ as catalyst, as well as 5 grams of sodium peroxide. While the liquid ammonia was being agitated, metallic sodium in the form of small pieces was added in an amount of 207.8 grams. The addition of the sodium took place over an interval of ½ hour, and conversion to sodamide was practically immediate. The porthole of the autoclave had been open up to this point, but was now closed, as were the various vents. By means of hot water in the insulating jacket, the temperature of the autoclave and contents was raised to 15–20° C. Nitrous oxide at a pressure in excess of the vapor pressure of the ammonia under the conditions was then admitted to the top of the autoclave. The nitrous oxide was absorbed rapidly and more was admitted as needed. The temperature was held below 35° C. by use of cooling water in the jacket. The amount of nitrous oxide introduced was approximately 276 grams, and the time of reaction was 2 hours. The ammonia was then removed by evaporation, the solid materials taken up with water, and the sodium azide separated. The amount of sodium azide produced was 262 grams, a conversion of 88.9% based on the sodium used.

Example 3

Another preparation was carried out in similar manner in the same apparatus, the amount of reactants being 1 gallon of anhydrous liquid ammonia, 198.1 grams of metallic sodium, and 312 grams of nitrous oxide. 3 grams of hydrated ferric nitrate was again used as catalyst, but no sodium peroxide was added. The conversion to sodium azide, based on the sodium used, was 83.3%.

From the description of the foregoing specific embodiments of our invention, the advantages over the prior art will be readily apparent. By the employment of liquid anhydrous ammonia and by reason of the low temperature reaction resulting therefrom, the safety of the process is greatly increased, and improved operating conditions result. This latter is an important consideration in view of the toxic nature of the products formed. Likewise, by carrying out both the sodamide and the sodium azide reactions in a liquid ammonia medium, there is no necessity for handling the intermediate product at a high temperature. The same apparatus can be employed, if desired, for both reactions.

The employment of super-atmospheric pressures during the reaction of nitrous oxide with the sodamide in anhydrous solution has many advantages, as has been stated, in the way of increased speed of reaction, greater range of temperature permissible for the liquid ammonia medium, saving of time, and in preventing excessive losses of gaseous or vaporous reactants. We find it desirable to carry out the sodium azide reaction at temperatures above 0° C., and room temperatures may well be used. The employment of pressure above atmospheric during the sodamide reaction prevents undue loss of ammonia. While sodium may be used in various phases and has been shown in the form of small pieces in the examples cited, we find it more convenient for addition and control when in molten form.

We find it important in the reaction between sodium and ammonia to use a catalyst comprising an iron salt, preferably a ferric salt as disclosed in U. S. Patents 2,163,100 and 2,202,994. The presence of the catalyst greatly shortens the time necessary for reaction. While all iron compounds appear to have catalytic effect, we preferably use ferric nitrate, ferric sulfate, ferric chloride, or other ferric compound. We find a suitable quantity of catalyst to be 1 to 1.5%, based on the amount of sodium used.

The examples have cited the preparation of sodium azide and this compound has been used mainly in illustrating the invention. It should be understood, however, that the invention includes the preparation of other alkali metal azides also, where the corresponding alkali metal is caused to react with anhydrous liquid ammonia and the product is reacted with nitrous oxide. While the second reaction has been described as taking place in a liquid ammonia medium, this latter may, if desired, be displaced by another anhydrous liquid, for example, anhydrous toluene, and the nitrous oxide be introduced thereinto. Many variations may be made from the details of operation and compositions, therefore, without departure from the scope of the invention. We intend to be limited only by the following patent claims.

We claim:

1. The two-step process of preparing an alkali metal azide which comprises first reacting an alkali metal with anhydrous liquid ammonia and in the second step maintaining nitrous oxide in intimate contact with the foregoing reaction mixture under a pressure substantially greater than atmospheric, the temperature throughout both steps of the process being maintained below the critical temperature of said anhydrous liquid ammonia, namely 132.4° C.

2. The process of preparing an alkali metal azide which comprises reacting nitrous oxide with an anhydrous liquid ammonia mixture containing an alkali amide, and maintaining said reactants under a pressure substantially greater than atmospheric, the temperature throughout both steps of the process being maintained below the critical temperature of said anhydrous liquid ammonia, namely 132.4° C.

3. The two-step process of preparing sodium azide which comprises first reacting metallic sodium with anhydrous liquid ammonia and in the second step maintaining nitrous oxide in intimate contact with the foregoing reaction mixture under a pressure substantially greater than atmospheric, the temperature throughout both steps of the process being maintained below the critical temperature of said anhydrous liquid ammonia, namely 132.4° C.

4. The process of preparing sodium azide which comprises reacting nitrous oxide with an anhydrous liquid ammonia mixture containing sodamide, and maintaining said reactants under a pressure substantially greater than atmospheric, the temperature throughout both steps of the process being maintained below the critical temperature of said anhydrous liquid ammonia, namely 132.4° C.

5. The two-step process of preparing sodium azide which comprises first reacting metallic sodium with anhydrous liquid ammonia, in the second step introducing nitrous oxide into intimate contact with the foregoing reaction mixture, and maintaining reactants under a pressure greater than atmospheric, the temperature throughout both steps of the process being maintained below the critical temperature of said anhydrous liquid ammonia, namely 132.4° C.

6. The process of claim 5, in which the sodium is introduced into the reaction in molten form.

7. The two-step process of preparing sodium azide which comprises first reacting metallic sodium with anhydrous liquid ammonia in the presence of a catalyst comprising a ferric salt, in the second step maintaining nitrous oxide in intimate contact with the foregoing reaction mixture under a pressure substantially greater than atmospheric substantially displacing the ammonia by evaporation, treating the solid materials with water, and separating the sodium azide, the temperature during the entire process being maintained below the critical temperature of said anhydrous liquid ammonia, namely 132.4° C.

8. The two-step process of preparing an alkali metal azide which comprises first reacting an alkali metal with anhydrous liquid ammonia and in the second step maintaining nitrous oxide in intimate contact with the foregoing reaction mixture under a pressure substantially greater than atmospheric pressure, the temperature being maintained below 35° C. throughout the process.

MARSHALL F. ACKEN.
WILLIAM F. FILBERT.